United States Patent
Aoyagi et al.

[11] Patent Number: 6,067,209
[45] Date of Patent: May 23, 2000

[54] DISK DRIVE DEVICE WITH SHOCK RESISTANCE FLEXURE AND RAMP LIMITED SYSTEM

[75] Inventors: Akihiko Aoyagi; David W. Albrecht, both of Fujisawa; Kohji Serizawa, Zama; Yuhji Kobayashi; Hiroo Inoue, both of Fujisawa, all of Japan

[73] Assignee: International Business Machines Corporation, Armonk, N.Y.

[21] Appl. No.: 09/099,117

[22] Filed: Jun. 17, 1998

[30] Foreign Application Priority Data

Aug. 6, 1997 [JP] Japan ................................. 9-212286

[51] Int. Cl.$^7$ ........................................................ G11B 5/54
[52] U.S. Cl. ............................................. 360/105; 360/104
[58] Field of Search ....................................... 360/105, 104

[56] References Cited

U.S. PATENT DOCUMENTS

| | | | |
|---|---|---|---|
| 5,289,325 | 2/1994 | Morehouse et al. | 360/105 |
| 5,692,289 | 12/1997 | Amada et al. | 29/603.03 |
| 5,754,368 | 5/1998 | Shiraishi et al. | 360/104 |
| 5,757,587 | 5/1998 | Berg et al. | 360/105 |
| 5,825,576 | 10/1998 | Kamerbeek | 360/75 |
| 5,831,786 | 11/1998 | Boutaghou et al. | 360/75 |
| 5,864,448 | 1/1999 | Berberich | 360/105 |
| 5,875,074 | 2/1999 | Ho et al. | 360/105 |
| 5,936,788 | 8/1999 | Boutaghou et al. | 360/75 |

*Primary Examiner*—Jefferson Evans
*Attorney, Agent, or Firm*—Douglas R. Millett

[57] ABSTRACT

The present invention prevents a head/slider assembly fixed on a flexure of a head suspension assembly from having an undesired pitching motion when an unexpected excess shock is applied to a hard disk device when the head suspension is at the best position of the unload ramp. A disk drive device in accordance with the present invention comprises: a rotating data recording disk; a head suspension assembly containing a front portion and a rear portion, with the front portion being provided with a tab; a device coupled to the rear portion of the head suspension assembly to move the front portion between an inner most position and an outer most position along a radial direction of the rotating data recording disk; a ramp element containing a support surface for engaging with the tab of the front portion of the head suspension assembly when the front portion is moved to the outer most position; and a flexure mounted on said front portion of the head suspension assembly, and having a front portion disposed towards the tab of the head suspension assembly and a rear portion disposed towards the rear portion of the head suspension assembly.

19 Claims, 8 Drawing Sheets

//]:#

DISK DRIVE DEVICE WITH SHOCK RESISTANCE FLEXURE AND RAMP LIMITED SYSTEM

BACKGROUND OF THE INVENTION

1. Field of the Invention

The invention relates to a disk drive device containing a rotating data recording disk and a head suspension assembly.

2. Description of the Prior Art

In a hard disk drive device, at least one magnetic recording disk is mounted on a spindle motor, and a head suspension assembly is provided for each of the data recording surfaces of the magnetic recording disk. The head suspension assembly contains an arm member, a rear end of which is mounted on a shaft mounted on a frame of the hard disk drive device, a load beam, a rear end of which is fixed on a front end of the arm member, a flexure, a rear end of which is fixed on a front portion of the load beam, and a head/slider assembly fixed on the flexure. The magnetic recording disk is rotated by the spindle motor, and the head suspension assemblies are moved in a radial direction of the magnetic recording disk by a voice coil motor (VCM).

FIG. 1 shows a portion of the magnetic recording disk 1 and the head suspension assembly 2. The radial direction of the head suspension assembly 2 is shown by arrows 3A and 3B. The disk 1 rotates in a direction shown by an arrow R. A ramp element 4 is mounted outside the magnetic recording disk 1. The ramp element 4 contains a ramped surface 5 and a rest position 6 for each of the head suspension assembly 2. For the ramp element 4 shown in FIG. 1, two magnetic recording disks and four head suspension assemblies are used. However, only one magnetic recording disk 1 and only one head suspension assembly 2 are shown for simplifying the drawing.

When the head suspension assembly 2 is moved in the direction of the arrow 3B by the VCM after the completion of a read/write operation, a load/unload tab 8A provided on the front end of the head suspension assembly 2 rides on the ramped surface 5 and is stopped at the rest position 6. This scheme for accessing the head/slider assembly 10 shown in FIG. 2 to and from a data track of the surface of the disk 1, and for holding the head suspension assembly 2 at the rest position 6 of the ramp element 4 is called Load/Unload.

The ramp element 4 may be provided with a plate 7 extended therefrom and that plate resides beyond the outside perimeter of the disk 1. FIG. 2 shows a detail of the front portion of the load beam 8 of the head suspension assembly 2 and the ramp element 4. In FIG. 2, two head suspension assemblies 2 are shown. One end of a flexure 9 is fixed to the load beam 8, and a head/slider assembly 10 is fixed on the free end of the flexure 9. A MR (magnetoresistive) head 51 is mounted within a front portion of a slider, and these are called the head/slider assembly. When the head suspension assemblies are positioned at the load/unload rest position 6, the head/slider assemblies 10 are beyond the outside perimeter of the disk 1.

A bent portion 9A is provided on the flexure 9, and the bent portion 9A extending through an aperture 11 of the load beam 8 is positioned to face a surface 8B of the load beam 8. When a shock is applied to the hard disk drive device during the state when the load/unload tab 8A is positioned on the rest position 6 of the ramp element 4, head/slider assembly 10 tends to move in a direction of an arrow 12. In this motion process, the bent portion 9A engages with the load beam 8, to prevent the head/slider assembly 10 from having excess motion in the direction of the arrow 12 that would cause the head/slider assembly 10 to collide against the plate 7, or the opposing head/slider assembly 10 if the plate 7 is not present.

As the size of the hard disk drive device becomes small, a space or distance $D_1$ between the surface of the head/slider assembly 10 and the plate 7 of the ramp element 4 is reduced to a small value, for example 0.2 mm. The inventors of the present invention have found that, in spite of the provision of the bent portion 9A, a front edge 10A or a rear edge 10B of the head/slider assembly 10 collides against the surface of the plate 7 of the ramp element 4 across the reduced distance $D_1$ when an unexpected excess shock is applied to the hard disk drive device.

The collision is caused by a movement of the head/slider assembly 10 in a pitching direction shown by an arrow 13 around the bent portion 9A and the reduced space $D_1$. The collision causes the following two problems. The first problem is that the ramp element 4 is made of an electrically nonconductive material, such as a plastic, and electrical charges accumulated on the ramp element 4 are transferred to the MR head 51 in the head/slider assembly 10 when it collides against the ramp element 4, so that the MR head 51 is damaged by the electrical charges. The second problem is that small pieces of plastic which are separated from the ramp element 4 due to the collision deposit on the surface of the head/slider assembly 10, and when the head/slider assembly 10 flies on the surface of the magnetic recording disk 1, the small pieces deposited on the head/slider assembly 10 contaminate or scratch portions of the surface of the disk 1. The damaged surface prevents the formation of an air bearing between the head/slider assembly 10 and the disk 1, so that the head/slider assembly 10 contacts on the damaged surface of the disk 1 during the read/write operation. The damage gradually spreads over the surface of the disk 1, whereby a desired read/write operation can not be performed on the damaged surface.

If the extended plate 7 is removed from the ramp element 4, the slider to slider separation distance $D_2$ in the FIG. 2 for a small hard disk drive device can be small, 0.65 mm for example, that when a shock is applied to the hard disk drive device, the slider motions including the pitching in the direction 13 will cause the slider to slider contact thereby damaging the air bearing surface of the slider or the head.

SUMMARY OF THE INVENTION

The object of the present invention is to provide a disk drive device which solves the problems described above.

A disk drive device according to the present invention comprises: a data recording disk, a head suspension assembly containing a front portion and a rear portion, with the front portion being provided with a tab, means coupled to the rear portion of the head suspension assembly to move the front portion between an inner most position and an outer most position along a radial direction of the rotating data recording disk, a ramp element containing a support surface for engaging with the tab of the front portion of the head suspension assembly when the front portion is moved to the outer most position, and a flexure mounted on the front portion of the head suspension assembly, and having a front portion disposed towards the tab of the head suspension assembly and a rear portion disposed towards the rear portion of the head suspension assembly. The ramp element is provided with an extended member which faces a surface of the front portion of the flexure with a predetermined space when the tab of the head suspension assembly engages with the support surface of the ramp element. The surface of the front portion of the flexure can be covered with a protection layer, such as an polyimide.

An alternative disk drive device in accordance with the present invention comprises: a rotating data recording disk a head suspension assembly containing a front portion and a rear portion, with the front portion being provided with a tab, means coupled to the rear portion of the head suspension assembly to move the front portion between the inner most position and an outer most position along a radial direction of the rotating data recording disk, a ramp element containing a support surface for engaging with the tab of the front portion of the head suspension assembly when the front portion is moved to the outer most position, and a flexure mounted on the front portion of the head suspension assembly, and having a front portion disposed towards the tab of the head suspension assembly and a rear portion disposed towards the rear portion of the head suspension assembly. The ramp element is provided with an extended member which faces a surface of the rear portion of the flexure with a predetermined space when the tab of the head suspension assembly engages with the support surface of the ramp element. The surface of the rear portion of the flexure can be covered with the protection layer, such as the polyimide.

The flexure is mounted on one surface of the head suspension assembly, and contains a bent portion extended to face the other surface of the head suspension assembly through an aperture of the head suspension assembly. The bent portion is provided between the front portion of the flexure and the rear portion of the flexure.

An alternative disk drive device in accordance with the present invention comprises: a rotating data recording disk a head suspension assembly containing a front portion and a rear portion, with the front portion being provided with a tab, means coupled to the rear portion of the head suspension assembly to move the front portion between an inner most position and an outer most position along a radial direction of the rotating data recording disk, a ramp element containing a support surface for engaging with the tab of the front portion of the head suspension assembly when the front portion is moved to the outer most position, and a flexure mounted on the front portion of the head suspension assembly, and having a front portion disposed towards the tab of the head suspension assembly and a rear portion disposed towards the rear portion of the head suspension assembly. The ramp element is provided with a first extended member which faces a surface of the front portion of the flexure with a predetermined space and a second extended member which faces a surface of the rear portion of the flexure with a predetermined space when the tab of the head suspension assembly engages with the support surface of the ramp element. The surface of the front portion and the rear portion of the flexure can be covered with the protection layer, such as the polyimide.

For a fuller understanding of the present invention, reference should be made to the following detailed description taken in conjunction with the accompanying drawings.

DESCRIPTION OF THE PREFERRED EMBODIMENT

Figure 4:
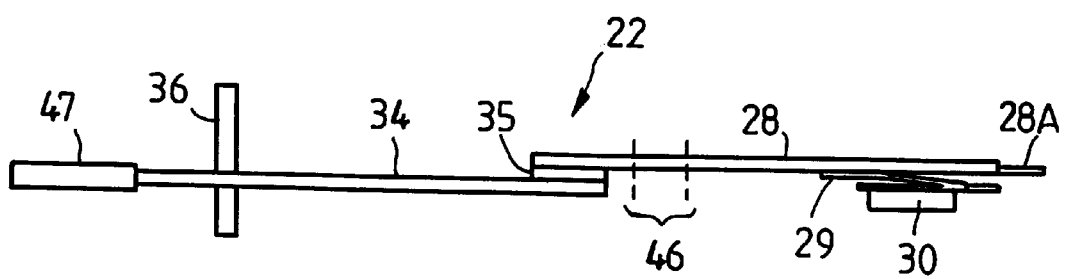
FIG. 4 shows a side view of the head suspension assembly.

FIGS. 3, 4, 5 and 6 show a first embodiment of the present invention. The hard disk drive device contains a plurality of rotating data recording disk or magnetic recording disks 21 mounted on a spindle motor, not shown. A head suspension assembly 22 is provided for each of data recording surfaces of the magnetic recording disk 21. As shown in FIG. 4, the head suspension assembly 22 contains an arm member 34, a load beam 28 fixed to the arm member 34 through a mount block 35. A rear portion of the head suspension assembly 22 is pivotally mounted on a shaft 36 mounted on a frame of the hard disk drive device. A voice coil motor (VCM) 47 is coupled to a rear portion of the head suspension assembly 22 to move a front portion of the head suspension assembly 22 between an inner most position and an outer most position along a radial direction 23A or 23B of the magnetic recording disk 21.

A load/unload tab 28A is provided on the front portion of the head suspension assembly 22. A flexure 29 has a rear portion fixed on the front portion of the head suspension assembly 22, and a front portion disposed towards the load/unload tab 28A of the head suspension assembly 22. The rear portion of the flexure 29 is disposed towards the rear portion of the head suspension assembly 22. A head/slider assembly 30 is fixed on a free portion of the flexure 29. The load beam 28 is provided with a bent area 46 to increase a flexibility of the load beam 28, and to provide a spring force means to load the head/slider assembly 30 against the disk 21.

In a read/write operation, the magnetic recording disks 21 are rotated by the spindle motor, and the head suspension assemblies 22 are rotated around the shaft 36 by the VCM 47 to move the head/slider assembly 30 between an inner most data recording track and an outer most data recording track of the magnetic recording disk 21 to position the head/slider assembly on a desired data recording track for reading data from the data recording track or writing the data in the data recording track.

A ramp element 24 is mounted on the frame of the hard disk drive device, and the ramp element 24 is positioned outside of the magnetic recording disk 21. The ramp element 24 contains a ramped surface 25 and a rest position or a support surface 26 for each of the head suspension assembly 22. For the ramp element 24 shown in FIG. 3, two magnetic recording disks 21 and four head suspension assembly 22 are used. However, only one magnetic recording disk 21 and only one head suspension assembly 22 are shown for simplifying FIG. 3.

When the head suspension assembly 22 is moved across the outer most data recording track of the magnetic recording disk 21 in the radial direction of the arrow 23B by the VCM 47 after the completion of the read/write operation, the load/unload tab 28A provided on the front portion of the head suspension assembly 22 is moved to engage with or ride on the ramped surface 25 to unload and lift the head/slider assembly 30 from the disk 21 and is stopped at the rest position 26 of the ramp element 24. This scheme for accessing the head/slider assembly 22 to and from a data recording track of the surface of the disk 21, and for holding the head suspension assembly 22 on the ramp element 24 is called Load/Unload. In this manner, the load/unload tab 28A of the front portion of the head suspension assembly 22 is moved between the inner most position above the inner most data recording track of the magnetic recording disk 21 and an outer most position defined by the rest position 26 of the ramp element 24 along the radial direction 23A/23B of the magnetic recording disk 21.

Figure 5:
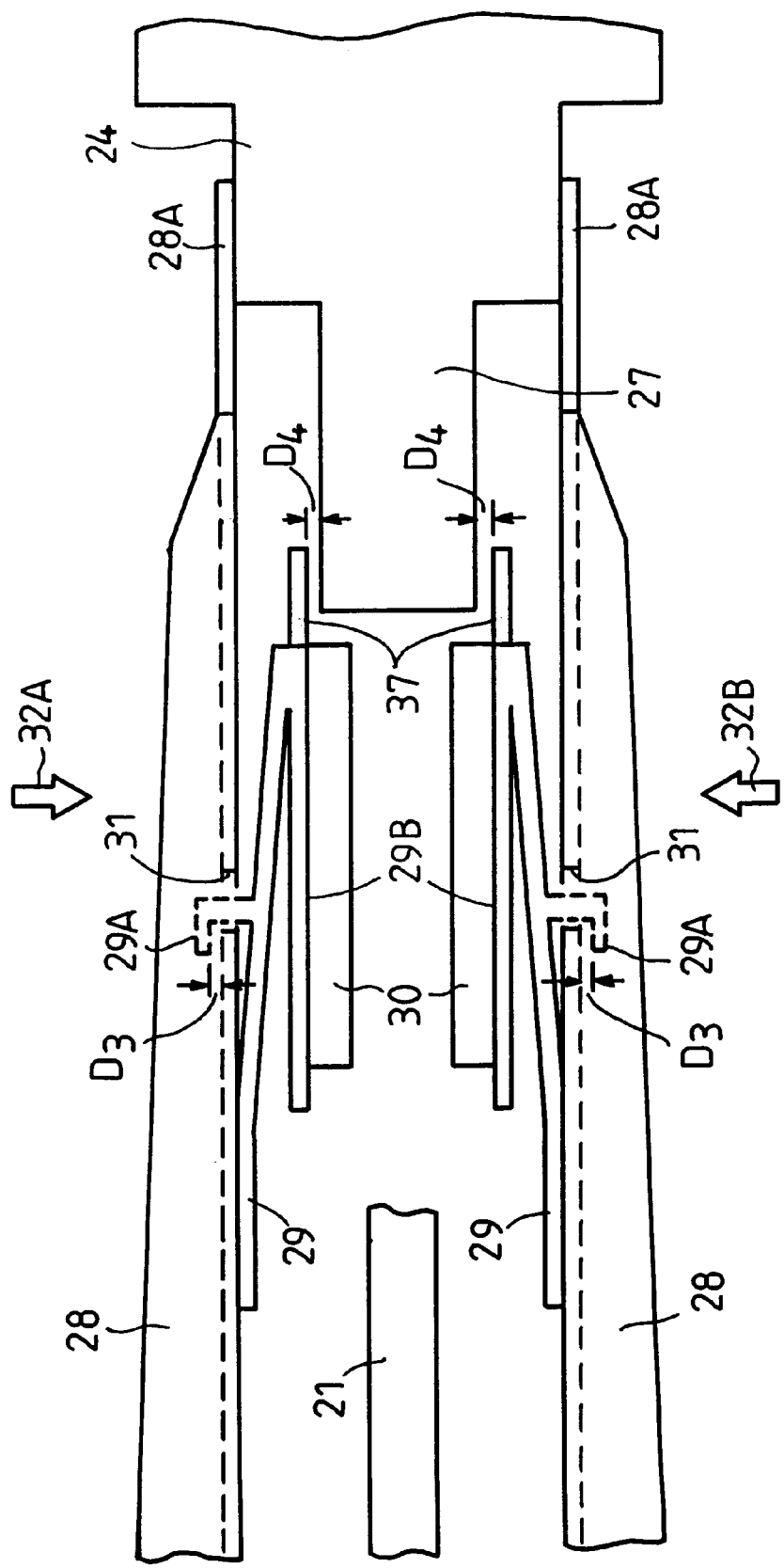
FIG. 5 is a cross sectional view of the magnetic recording disk, the head suspension assembly and the ramp element shown in the FIG. 3.
Figure 6:
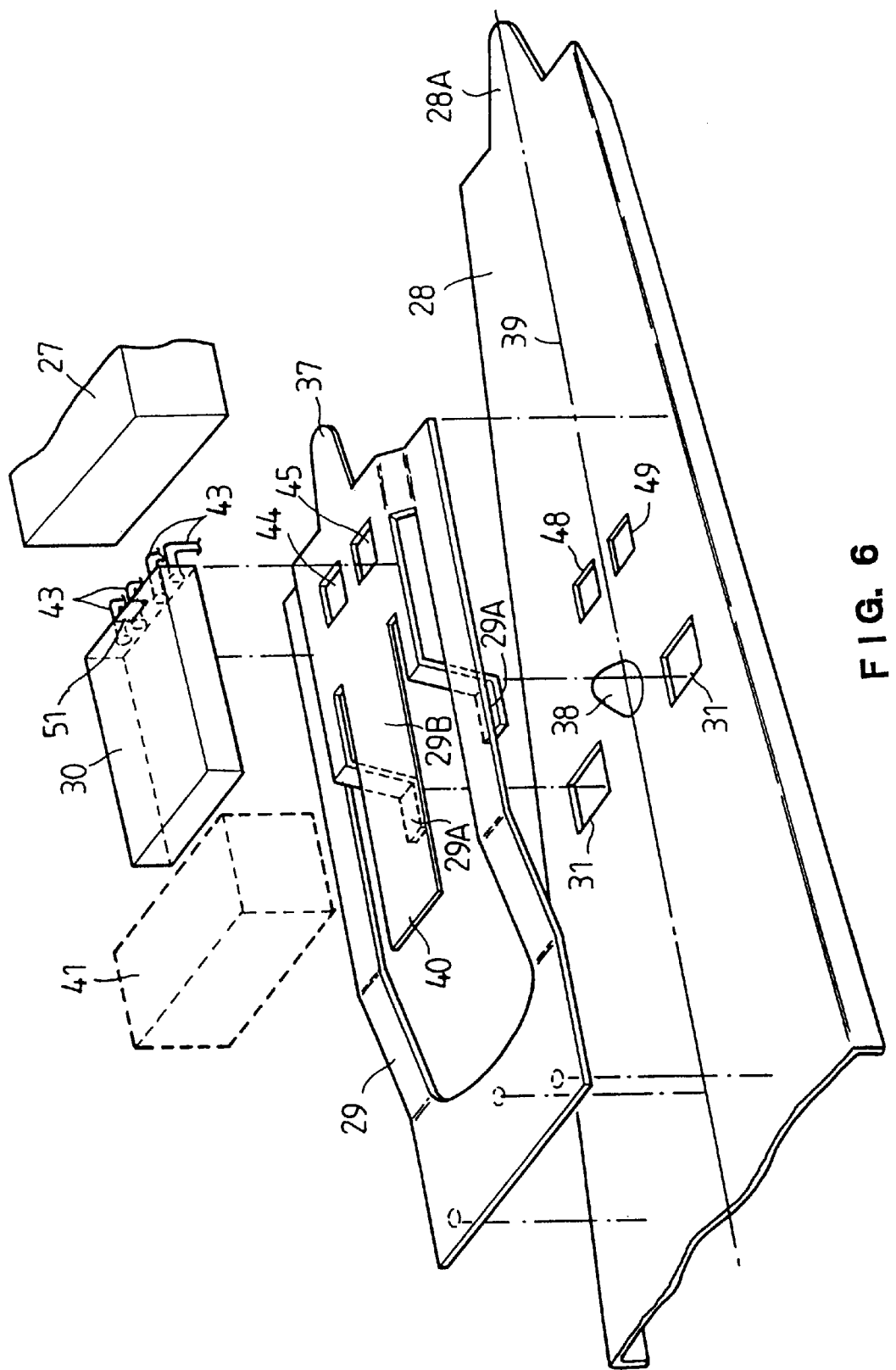
FIG. 6 is an exploded view of the head suspension assembly in accordance with the present invention.

The ramp element 24 is provided with an extended member or a block member 27 extended from the ramp element 24. FIGS. 5 and 6 show the detailed structure of the front portion of the load beam 28 of the head suspension assembly 22 and the ramp element 24. In FIG. 5, two head suspension assemblies 22 arranged on both data recording surfaces of the magnetic recording disk 21 are shown. As shown in FIGS. 5 and 6, one end of a flexure 29 is fixed to the load beam 28, and a head/slider assembly 30 is fixed on a surface of the free portion 29B of the flexure 29 by an adhesive material. A MR (magnetoresistive) head 51 is resident within a front end of a slider, and these are called the head/slider assembly 30. Four electrically conductive connecting wires 43 of the MR head can pass through apertures 44 and 45 of the flexure 29 and apertures 48 and 49 of the load beam 28, and can be fixed on the surface (lower surface in FIG. 6) of the load beam 28 or the connecting conductors 43 to the MR head can be integral to the flexure 29 as is the case for the integrated lead suspension (ILS) configuration. A dimple 38 is provided on the load beam 28 to contact with a surface of the free portion 29B to provide a gimbal movement of the head/slider assembly 30.

Two bent portions 29A are provided between the front portion of the flexure and the rear portion of the flexure 29. The flexure 29 is mounted on one surface (an upper surface in FIG. 6) of the load beam 28. Each of the bent portions 29A extending through apertures 31 of the load beam 28 is positioned to face the other surface (lower surface in FIG. 6) of the load beam 28. When a shock is applied to the hard disk drive device during the state when the load/unload tab 28A is positioned on the rest position 26 of the ramp element 24, head/slider assembly 30 tends to move in a direction of an arrow 32A or 32B as shown in FIG. 5, and the bent portions 29A engage with the surface of the load beam 28, so that an excess movement of the head/slider assembly 30 in the direction of the arrow 32A or 32B due to the shock is prevented by the engagement of the bent portion 29A with the surface of the load beam 28.

Figure 1:
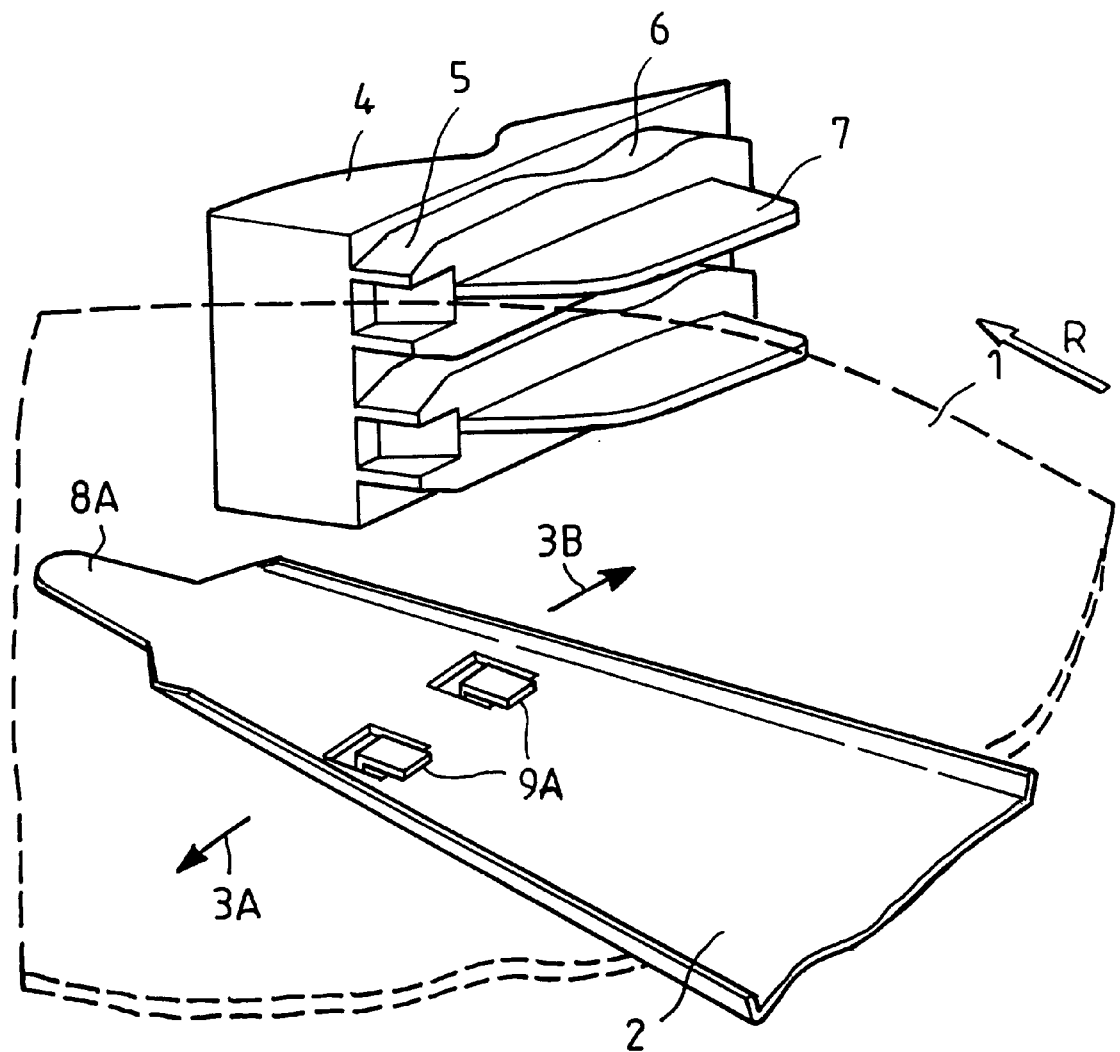
FIG. 1 is a perspective view of a magnetic recording disk, a head suspension assembly, and a ramp element of a prior art disk drive device.
Figure 2:
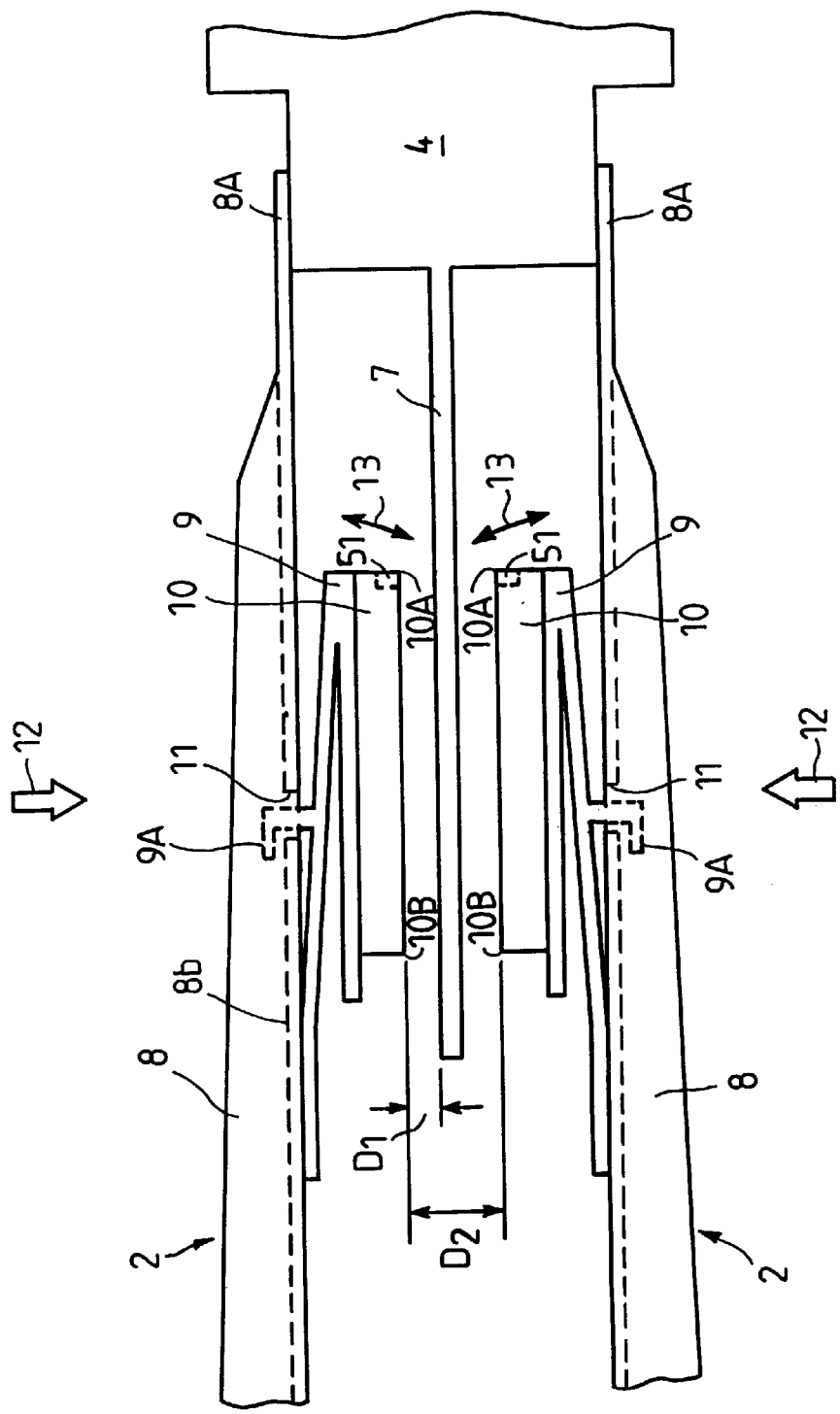
FIG. 2 is a cross sectional view of the magnetic recording disk, the head suspension assembly and the ramp element shown in FIG. 1.
Figure 3:
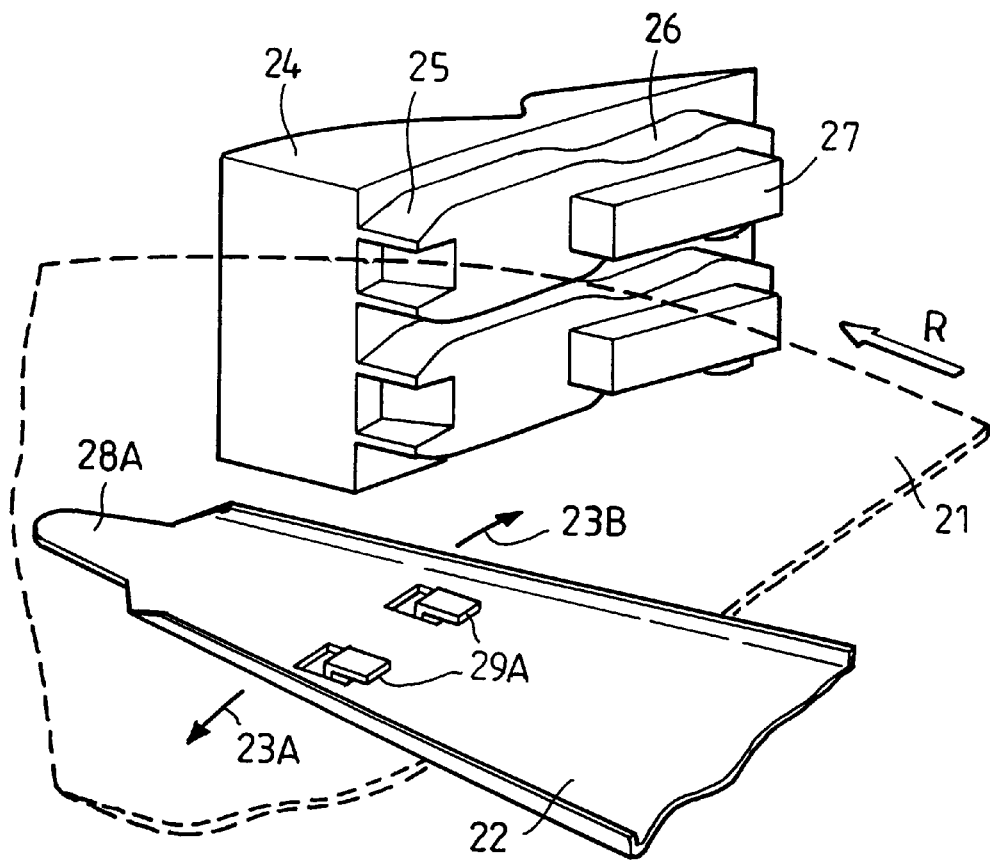
FIG. 3 is a perspective view of a magnetic recording disk, a head suspension assembly, and a ramp element of a first embodiment of a hard disk drive device in accordance with the present invention.

To minimize the movement of the head/slider assembly 30 in the pitching direction 13 shown in FIG. 2 which occurred in the prior art disk drive device, the flexure 29 is provided with an engaging surface 37, and the ramp element 24 is provided with the extended member 27 in accordance with the present invention. The engaging surface 37 of the flexure 29 is arranged or positioned at a position between the head/slider assembly 30 and the load/unload tab 28A of the load beam 28. The engaging surface 37 is a portion extended from the flexure 29. The engaging surface 37 and the extended member 27 are so positioned that the engaging surface 37 faces the surface of the extended member 27 with a predetermined space when the load/unload tab 28A engages with the rest position 26 of the ramp element 24.

When the head/slider assembly 30 is moved in the pitching direction 13 shown in FIG. 2, due to the shock applied to the hard disk drive device, the movement of the engaging surface 37 is stopped by the extended member 27. Also, the bent portions 29A engage with the load beam 28 when the shock is applied. The separation distance $D_4$ between the flexure's engaging surface 37 and the extended member 27 is chosen based on the space $D_3$ between the bent portion 29A and the load beam 28 in order to minimize the amplitude of pitching motion of the head/slider assembly 30 during the shock event. Typically, the system is designed to permit the bent portion 29A to engage the load beam 28 before the engaging surface 37 contacts the extended member 27. For example for the first embodiment, if the space $D_3$ between the bent portion 29A and the load beam 28 is 0.075 mm, then a typical separation or space $D_4$ between the engaging surface 37 and the extended member 27 will be on the order of 0.50 mm. The optimized values $D_3$ and $D_4$ for any system are a function of many parameters, such as a bending stiffness of the load beam, a size of the slider, a size of the load beam and a size of the flexure.

In this manner, the engaging surface 37 and the bent portions 29A arranged along a center line 39 of the head suspension assembly 22 minimize the movement of the head/slider assembly 30 in the pitching direction 13 shown in FIG. 2. Further, the two bent portions 29A arranged on the both sides of the center line 39 of the head supporting arm 22 prevent the movement of the head/slider assembly 30 in a rolling direction. The movement in the rolling direction means a movement of the head/slider assembly 30 around the center line 39.

Figure 7:
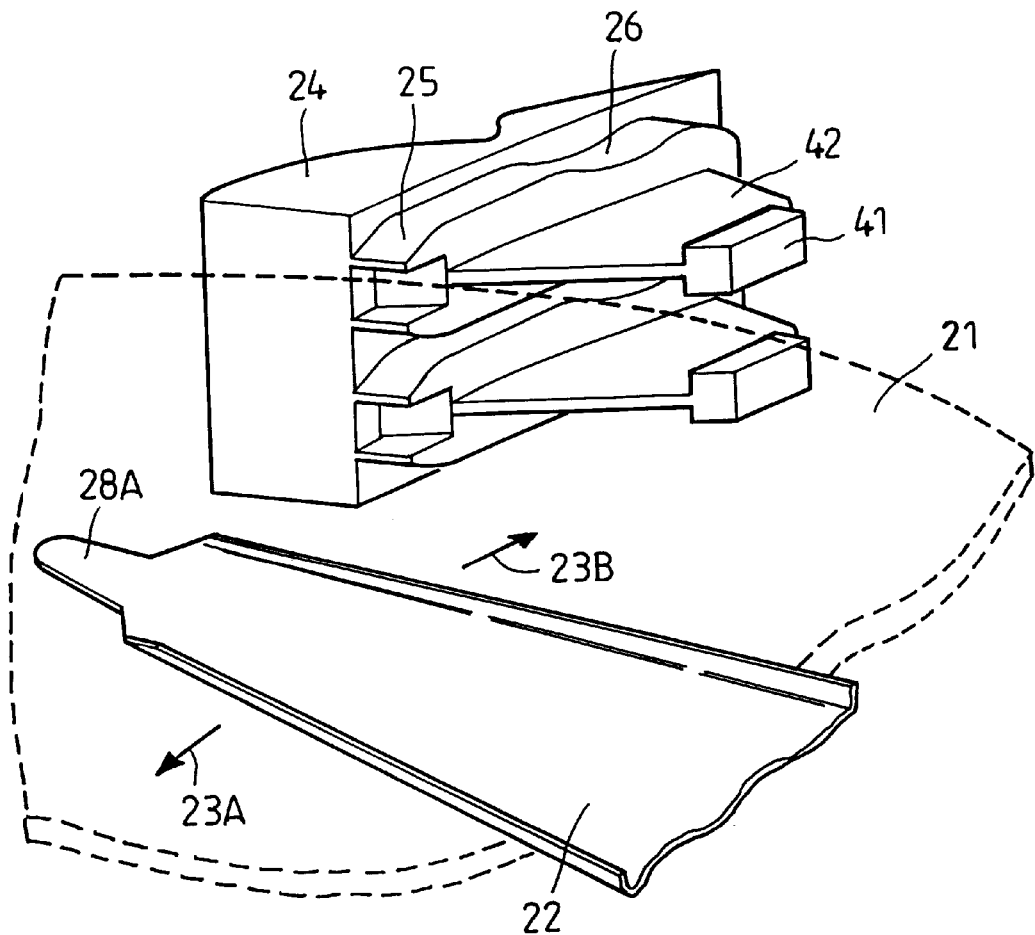
FIG. 7 is a perspective view of a magnetic recording disk, a head suspension assembly, and a ramp element of a second embodiment of a hard disk drive device in accordance with the present invention.
Figure 8:
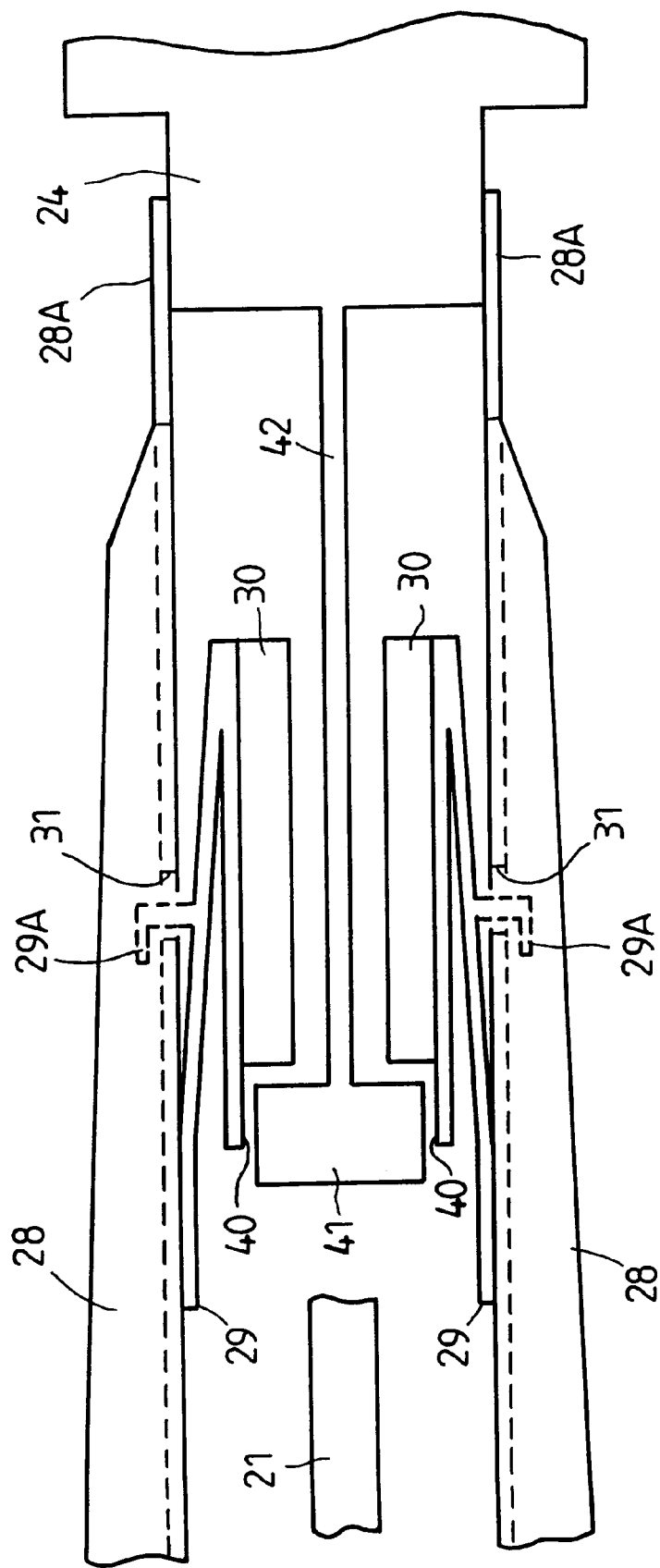
FIG. 8 is a cross sectional view of the magnetic recording disk, the head suspension assembly and the ramp element shown in the FIG. 7.

FIGS. 7 and 8 show a second embodiment of the present invention. The same reference numbers as that in the first embodiment are assigned to the same elements as that of the first embodiment. The structure of the second embodiment is substantially the same as the structure of the first embodiment except that the ramp element 24 is provided with a connecting portion 42 and an extended member 41, and the extended member 41 faces a surface 40 of the rear portion of the flexure 29 with a predetermined space when the load/unload tab 28A engages with the rest position 26 of the ramp element 24. The engaging surface 40 is arranged on the flexure 29 at a position between the head/slider assembly 30 and the rear portion of the head suspension assembly 22. The connecting portion 42 extends between the two head/slider assemblies 30 facing each other.

When the head/slider assembly 30 is moved in the pitching direction 13 shown in FIG. 2, due to the shock applied to the hard disk drive device, the movement of the engaging surface 40 is stopped by the extended member 41. Also, the bent portions 29A engage with the load beam 28 when the shock is applied. In this manner, the engaging surface 40 and the bent portions 29A arranged along a center line 39 of the head supporting arm 22 minimize the movement of the head/slider assembly 30 in the pitching direction 13 shown in FIG. 2. Further, the two bent portions 29A arranged on the both sides of the center line 39 of the head supporting arm 22 prevent the movement of the head/slider assembly 30 in the rolling direction.

Figure 9:
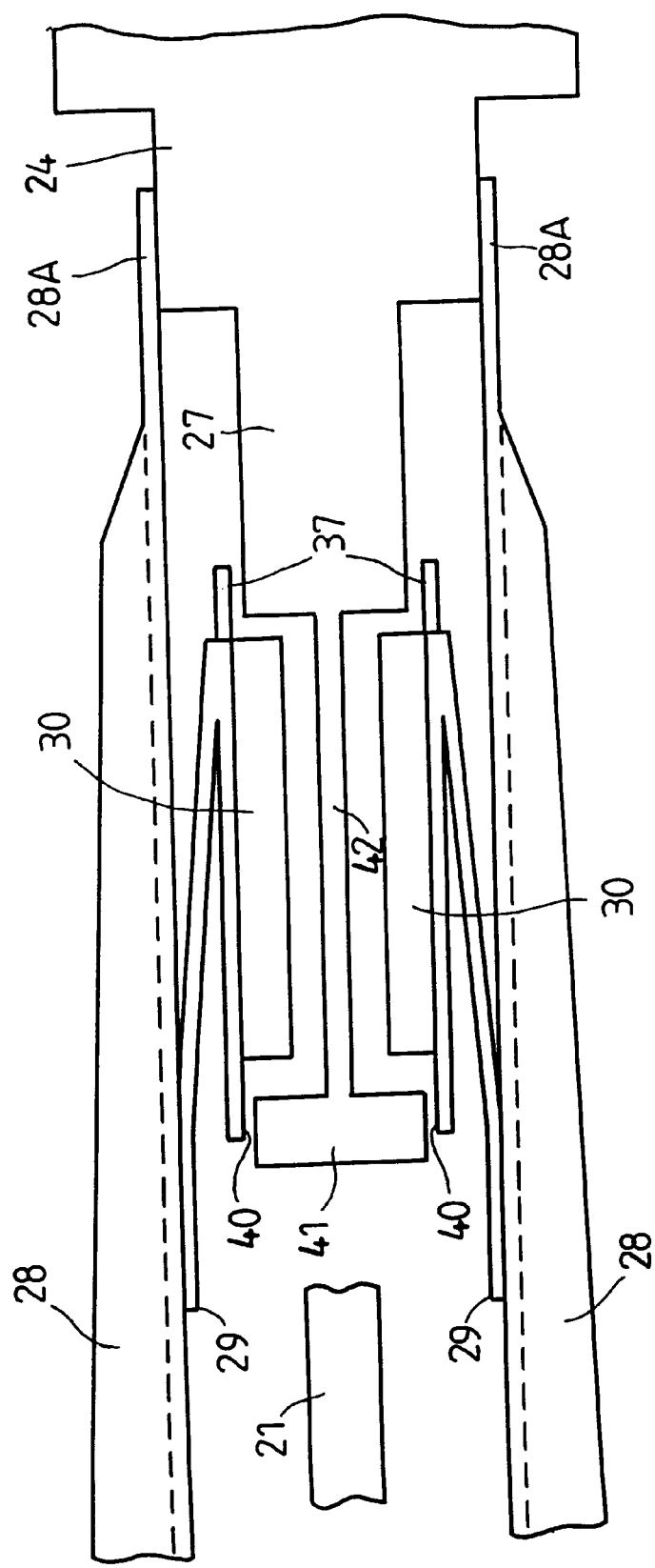
FIG. 9 is a side view of a magnetic recording disk, a head suspension assembly, and a ramp element of a third embodiment of a hard disk drive device in accordance with the present invention.

FIG. 9 shows a third embodiment of the present invention. The same reference numbers as that in the first embodiment are assigned to the same elements as that of the first embodiment. The structure of the third embodiment is substantially the same as the structures of the first and second embodiments expect that the ramp element 24 is provided with the extended member 27 of the first embodiment and the extended member 41 of the second embodiment and the bent portion 29A is not necessarily required. The extended member 27 is called a first extended member and the extended member 41 is called a second extended member in the third embodiment. The first extended member 27 faces the surface 37 of the front portion of the flexure 29 and the second extended member 41 faces the surface 40 of the rear portion of the flexure 29 with the predetermined space, respectively when the load/unload tab 28A engages with the rest position 26 of the ramp element 24.

It is noted that the bent portions 29A and the apertures 31 are not necessarily required in the third embodiment. When the head/slider assembly 30 is moved in the pitching direction 13 shown in FIG. 2, due to the shock applied to the hard disk drive device, the movement of the engaging surface 37 is stopped by the first extended member 27 and the movement of the engaging surface 40 is stopped by the second extended member 41.

Figure 10:
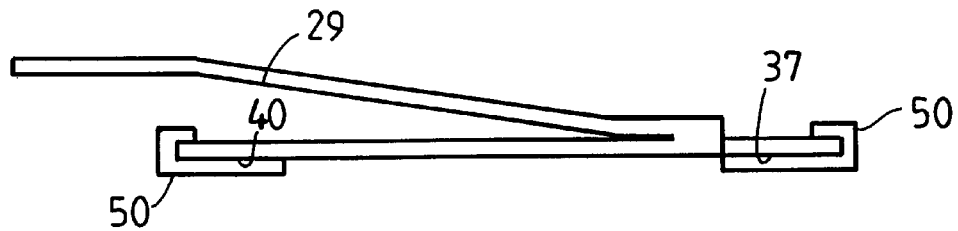
FIG. 10 shows a protective layer provided on engaging surfaces of the flexure in accordance with the present invention.

As shown in FIG. 10, the engaging surfaces 37 of the front portion of the flexure 29 and the engaging surface 40 of the rear portion of the flexure 29 of the first, second or third embodiments can be covered with a protective layer 50, such as a polyimide material to prevent the extended members 27 and 41 made of a plastic material from being damaged by the engaging surfaces 37 and 40 made of a stainless steel, respectively, when the engaging surface 37 and 40 are stopped by the extended members 27 and 41. In FIG. 10, the protective layer 50 is shown as being on both sides of the flexure surfaces 37 and 40, but it may be more readily implemented in the case of the integrated lead suspension technology for example, on only the flexure surface 37 or 40 that is disposed towards either the ramp surface 27 or 41.

The present invention solves the first problem and the second problem described hereinbefore due to the collision which is caused by the movement of the head/slider assembly in the pitching direction.

While the preferred embodiments of the present invention have been illustrated in detail, it should be apparent that modifications and adaptations to those embodiments may occur to one skilled in the art without departing from the scope of the present invention as set forth in the following claims.

We claim:

1. A disk drive device comprising:
   a rotating data recording disk;
   a head suspension assembly containing a front portion and a rear portion, said front portion being provided with a tab;
   means coupled to said rear portion of said head suspension assembly to move said front portion between an inner most position and an outer most position along a radial direction of said rotating data recording disk;
   a ramp element containing a support surface for engaging with said tab of said front portion of said head suspension assembly when said front portion is moved to said outer most position;
   a flexure mounted on said front portion of said head suspension assembly, and having a front portion disposed towards said tab of said head suspension assembly and a rear portion disposed towards said rear portion of said head suspension assembly; and
   said ramp element is provided with a first extended member which faces a surface of said front portion of said flexure with a predetermined space and a second extended member which faces a surface of said rear portion of said flexure with a predetermined space when said tab of said head suspension assembly engages with said support surface of said ramp element.

2. A disk drive device according to claim 1, wherein said surface of said front portion and said rear portion of said flexure are covered with a protection layer.

3. A disk drive device according to claim 2, wherein said protection layer is a polyimide.

4. A transducer suspension system comprising:
   a load beam having a front and rear portions, the rear portion adapted for connection to a support member and the front portion having a load beam extension tab member for engagement with a ramp member; and
   a flexure member connected to the front portion of the load beam, the flexure member having an extension tab member for engagement with the ramp member, the flexure having a portion for connection to a transducer element.

5. The system of claim 4, wherein a transducer/slider element is connected to the flexure member.

6. The system of claim 4, wherein the flexure extension tab member is covered with a protective layer.

7. The system of claim 6, wherein the protective layer is a polyimide.

8. The system of claim 4, wherein the flexure extension tab member extends from a front portion of the flexure member.

9. The system of claim 4, wherein the flexure extension tab member extends from a rear portion of the flexure member.

10. The system of claim 4, wherein the said flexure member is mounted on one surface of said load beam, and contains a bent portion extending to face the other surface of said load beam through an aperture in said load beam.

11. The system of claim 10, wherein said bent portion is provided between a front portion of said flexure and a rear portion of said flexure.

12. A transducer suspension system comprising:
   a load beam having a front and rear portions, the rear portion adapted for a connection to a support member and the front portion having a load beam extension tab member for engagement with a ramp member;
   a flexure member connected to the front portion of the load beam, the flexure member having an extension tab member for engagement with a ramp member, the flexure having a portion for connection to a transducer element;
   a transducer element attached to the flexure member; and
   a rotating recording medium located proximate to the transducer member.

13. The system of claim 12, wherein a transducer/slider element is connected to the flexure member.

14. The system of claim 12, wherein the flexure extension tab member is covered with a protective layer.

15. The system of claim 12, wherein the protective layer is a polyimide.

16. The system of claim 12, wherein the flexure extension tab member extends from a front portion of the flexure member.

17. The system of claim 12, wherein the flexure extension tab member extends from a rear portion of the flexure member.

18. The system of claim 12, wherein the said flexure member is mounted on one surface of said load beam, and contains a bent portion extending to face the other surface of said load beam through an aperture in said load beam.

19. The system of claim 18, wherein said bent portion is provided between a front portion of said flexure and a rear portion of said flexure.

* * * * *